A. PAJALIC.
BREATHER FOR GAS ENGINES.
APPLICATION FILED SEPT. 29, 1919.

1,352,022.

Patented Sept. 7, 1920.

WITNESSES
C. A. Buchanan.

INVENTOR
A. Pajalic,
BY
ATTORNEYS

UNITED STATES PATENT OFFICE.

ANTONIO PAJALIC, OF DEARBORN, MICHIGAN.

BREATHER FOR GAS-ENGINES.

1,352,022.    Specification of Letters Patent.    Patented Sept. 7, 1920.

Application filed September 29, 1919. Serial No. 327,030.

*To all whom it may concern:*

Be it known that I, ANTONIO PAJALIC, a subject of the King of Italy, and a resident of Dearborn, in the county of Wayne and State of Michigan, have made certain new and useful Improvements in Breathers for Gas-Engines, of which the following is a specification.

My invention relates to an improved breather for gas engines.

An important object of my invention is to provide an improved breather for gas engines, which will serve to allow free escape of compression from the crank case, and will serve to separate and return to the crank case any entrained oil or the like.

Another important object is to provide for the exclusion of dust or other foreign substances from the crank case and for allowing for the admission of air.

Another important object is to provide an improved breather for crank cases of simple and durable construction easy and simple to manufacture and reliable in operation.

Other objects and advantages reside in the certain novel features of the construction, arrangement and combination of parts, and will become apparent as the description proceeds, reference being had to the accompanying drawing, forming a part of this specification, and in which—

Figure 1:
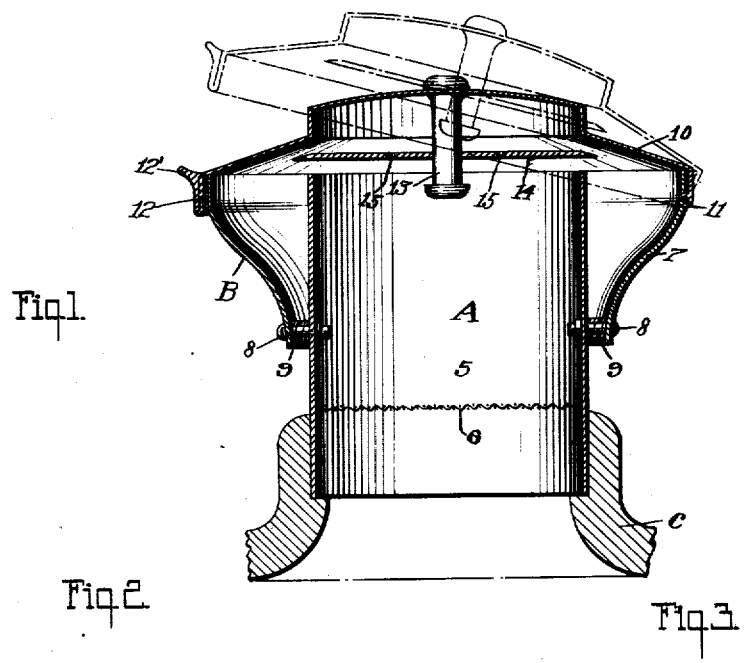
Figure 1 is a vertical sectional view showing one form of my invention.

Referring to the drawings, it will be seen that my invention comprises generally an inner casing indicated as a whole as A, and an outer casing indicated as a whole as B. The inner casing A is supported by and communicates with the crank case C, and the outer casing B is supported on the inner casing A and communicates with the inner casing A and with the atmosphere, as will be hereinafter more fully described.

Figures 2, 3:
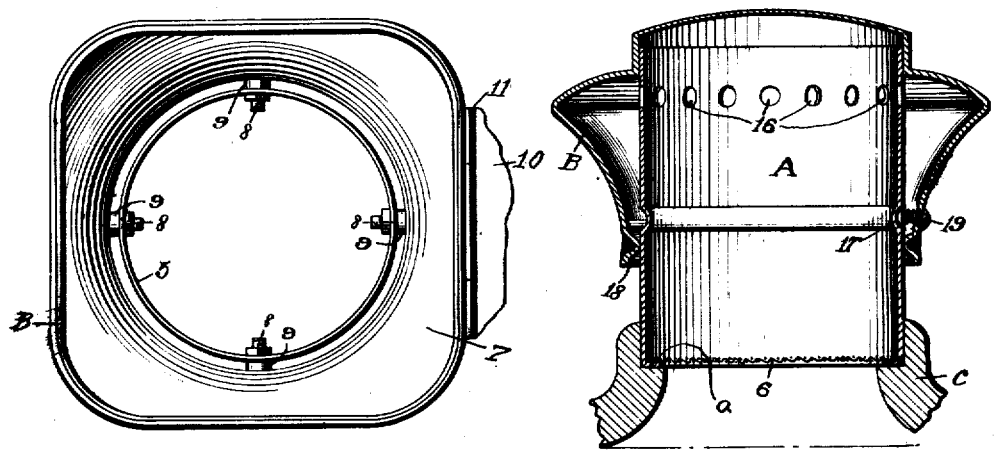
Fig. 2 is a top plan view of the form of invention shown in Fig. 1, a portion of the cap being broken away for the sake of illustration.
Fig. 3 is a vertical sectional view showing another form of my invention.

In the form of my invention shown in Figs. 1 and 2, the inner casing consists simply of a cylindrical tube 5 open at both ends. The lower end of the casing is secured in any suitable manner to the crank case and adjacent the lower end a reticulated screen 6 is provided which extends entirely across the opening of the tube. The outer casing B is formed of two sections, the lower section 7 being supported on the inner casing by bolts and nuts 8, as shown in the drawing. Spacing sleeves 9 are mounted on these bolts and serve to space the lower portion of the outer casing from the outer wall of the inner casing. The lower section curves outwardly and upwardly away from the inner casing and presents a cross section, as shown in Fig. 2. The upper section comprises a hinged cap 10 adapted to swing on a pivot pin 11 journaled in the lower section, and has a depending annular flange 12 overlapping the upper end of the lower section. A gripping portion 12' is provided to facilitate operation of the cap.

A double headed stem 13 is secured to the hinged cap and depends vertically therefrom. This stem is preferably arranged centrally of the hinged cap and of the inner casing, and a disk valve 14 is mounted thereon for slidable movement. The disk valve normally rests upon the upper end of the inner casing and serves to close the upper end, but when the hinged cap is swung to open position, it is retained on the stem by the action of the lower head thereof. This valve is provided with a circumferential series of ports 15. A plurality of series of such ports may be provided if desired.

In the form of my invention shown in Fig. 3, the cylindrical open ended tube constituting the inner casing is provided near its upper end with a circumferential series of openings or ports 16, and its central portion or approximately its central portion is pressed inwardly to form an annular groove 17. The outer casing is integral and the lower portion thereof is provided with a plurality of beads 18 pressed inwardly therefrom, and preferably arranged circumferentially thereof. These beads serve to space the lower portion of the outer casing from the inner casing and provide for free communication thereof with the atmosphere. The walls of the outer casing curve upwardly and away from the inner casing, as shown in the drawing. The upper portion of the outer casing as shown in Fig. 3, is cylindrical and constructed and arranged for a sliding fit over the upper open end of the inner casing. The walls of this cylindrical portion are adapted in the lowermost position of the outer casing to almost entirely cover the ports 16, and in this manner constitutes a valve controlling communication between the inner and outer casing.

A locking button or set screw 19 is mounted in the outer casing and is adapted to coöperate with the annular groove 17 to maintain the outer casing in fixed position on the inner casing. This locking button preferably consists of a threaded shank having a head on its inner end adapted to coöperate with the groove 17 and a slotted head on its outer end adapted to be operated to set or release the lock head.

As described in the foregoing paragraph, the locking button may be operated to set or release the lock head, and when it is operated to release the lock head the outer casing is free to move longitudinally with respect to the inner casing. When the locking button is released the outer casing falls until its upper cylindrical portion completely covers the port 16 and at this time the top end of the inner casing engages the top wall of the outer casing and prevents further movement downwardly. The outer casing is however free to move upwardly and under some conditions does so move as will be hereinafter more fully described.

If desired, a reticulated screen 6 may be disposed at the lower end of the cylinder and retained in this position by an inturned flange a integral with the cylinder in place of a screen disposed at the position shown in Fig. 1, or may be utilized in addition to the screen positioned as shown in Fig. 1.

Figure 4:
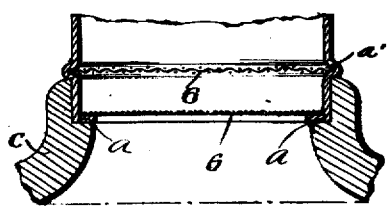
Fig. 4 is a sectional view showing in detail the screen holding means of the cylinder.

As shown in Fig. 4, the upper screen 6 may be secured to the cylinder A by a crimp a' formed in the cylinder wall. This crimp extends entirely around the cylinder wall and when the cylinder is in position on the crank case, it seats upon the adjacent wall thereof and serves as an additional seal against the ingress of foreign substances.

In operation, when compression occurs in the crank case, the gases under compression travel upwardly through the screen 6, which tends to separate any entrained oil therefrom and allow the same to drop back into the crank case. The gases continue to travel until they strike against the disk valve or the inner wall of the top of the cylindrical portion of the outer casing as the case may be. In the first instance they move the disk valve upwardly, and in the second instance they move the entire outer casing upwardly until the ports 16 are entirely uncovered. The gases then travel laterally into the outer casing, and then downwardly between the spaced portion of the outer casing and the outer wall of the inner casing, into the atmosphere.

It is to be noted that in operating either the valve or the outer casing, the gases are baffled or deflected and any oil entrained despite the action of the screen 6, is separated by this deflecting action and drops back upon the screen 6, and subsequently into the crank case. Should rarefaction occur in the crank case, the air travels upwardly between the spaced lower portion of the outer case and the outer wall of the inner case is deflected laterally by the top of the outer casing, and then enters the inner casing through the ports 15 or 16, as the case may be. In either event any entrained substance such as dust and the like, is prevented from entering the crank case and the entering air has been repeatedly deflected and can only enter through the restricted passages offered by the port 15 or 16.

If it is desired to have a free communication with the crank case, the hinged upper section may be swung to open position in the modifications shown in Figs. 1 and 2, or the entire outer casing may be removed by releasing the locking button in the modification shown in Fig. 3.

I claim:—

1. A breather for gas engines comprising an inner cylindrical tube open at both ends, having its lower open end communicating with the crank case and its upper open end constituting an outlet, an outer casing having its lower portion spaced from said inner casing, and supported thereon, and curving upwardly and away from said inner casing, and having a top section extending entirely across the upper open end of said inner section, a stem vertically depending from said upper section, and a disk valve mounted for vertical movement on said stem and adapted to normally close the upper open end of said inner casing, and to be operated by the pressure in said crank case to uncover said upper end, said disk valve being provided with a circumferential series of ports.

2. A breather for gas engines comprising an inner cylindrical tube open at both ends, having its lower open end communicating with the crank case and its upper open end constituting an outlet, an outer casing having its lower portion spaced from said inner casing, and supported thereon, and curving upwardly and away from said inner casing, and having a top section extending entirely across the upper open end of said inner section, a stem vertically depending from said upper section, and a disk valve mounted for vertical movement on said stem and adapted to normally close the upper open end of said inner casing, and to be operated by the pressure in said crank case to uncover said upper end.

3. A breather for gas engines comprising an inner cylindrical tube open at both ends and having its lower open end communicating with the crank case, and having its upper open end constituting an outlet, an outer casing having its lower portion spaced from said inner casing to communicate with the atmosphere, a stem vertically depending from said outer casing, and a disk valve mounted for vertical movement on said stem, and adapted to normally close the upper open end of said inner casing, and to be operated by compression in the crank case to uncover said upper open end to allow escape of said compression outwardly through said casing to the atmosphere.

4. A breather for gas engines comprising, an inner cylindrical tube open at both ends and having its lower end communicating with a crank casing and an outlet at its upper end, an outer casing having its lower portion spaced from said inner casing and curved upwardly and away from said inner casing and having a top section extending across the upper open end of said inner section, and a pressure operated valve carried by said outer casing for controlling the outlet of said inner casing.

5. A breather for gas engines comprising an inner casing communicating with the interior of the crank case, an outer casing communicating with said inner casing and with the atmosphere, and a pressure operated valve carried by said outer casing and controlling communication between said inner and said outer casings.

ANTONIO PAJALIC.

Witnesses:
GUSTAV O. CILIAX,
REINDER DE VRIES.